United States Patent
Muramatsu

(10) Patent No.: US 8,254,773 B2
(45) Date of Patent: Aug. 28, 2012

(54) IMAGE TRACKING APPARATUS AND TRACKING EVALUATION METHOD

(75) Inventor: Keiko Muramatsu, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/915,121

(22) Filed: Oct. 29, 2010

(65) Prior Publication Data

US 2011/0038624 A1 Feb. 17, 2011

Related U.S. Application Data

(63) Continuation of application No. 12/060,961, filed on Apr. 2, 2008, now abandoned.

(30) Foreign Application Priority Data

May 28, 2007 (JP) .................................. 2007-140114

(51) Int. Cl.
*G03B 15/16* (2006.01)
*G03B 13/36* (2006.01)
(52) U.S. Cl. ............. 396/95; 396/102; 396/82; 348/346
(58) Field of Classification Search .................... 396/82, 396/102
See application file for complete search history.

(56) References Cited

U.S. PATENT DOCUMENTS

| | | | |
|---|---|---|---|
| 4,903,134 A | 2/1990 | Murashima et al. | |
| 5,061,951 A | 10/1991 | Higashihara et al. | |
| 5,192,966 A | 3/1993 | Hamada et al. | |
| 5,913,079 A * | 6/1999 | Aoyama et al. ................. | 396/51 |
| 6,308,015 B1 | 10/2001 | Matsumoto | |
| 7,003,223 B2 | 2/2006 | Sasaki et al. | |
| 7,515,200 B2 | 4/2009 | Yasuda | |
| 7,519,285 B2 | 4/2009 | Ishii | |
| 7,630,623 B2 | 12/2009 | Ishii | |
| 2005/0162540 A1 | 7/2005 | Yata | |
| 2007/0196091 A1 | 8/2007 | Yamaguchi | |

FOREIGN PATENT DOCUMENTS

JP 08-062486 3/1996
(Continued)

OTHER PUBLICATIONS

Japanese Office Action for corresponding JP Application No. 2007-140114, May 24, 2011.

(Continued)

*Primary Examiner* — Clayton E Labelle
*Assistant Examiner* — Bret Adams
(74) *Attorney, Agent, or Firm* — Ditthavong Mori & Steiner, P.C.

(57) ABSTRACT

An image apparatus includes a screen, a detecting unit, a determining unit, an acquiring unit and a control unit. The screen is configured to display an image formed by an optical system and at least one detection position superimposed onto the image. The detecting unit is configured to detect information regarding focus of the optical system at the detection position. The determining unit is connected to the detecting unit and configured to determine whether the information regarding the focus is within a predetermined range. The acquiring unit is connected to the determining unit and configured to acquire first image information at the detection position when the determining unit determines that the information regarding the focus is within the predetermined range. The control unit is connected to the acquiring unit and configured to evaluate arbitrary second image information in the screen using the first image information.

36 Claims, 17 Drawing Sheets

FOREIGN PATENT DOCUMENTS

| | | |
|---|---|---|
| JP | 8-62486 | 3/1996 |
| JP | 09-297348 | 11/1997 |
| JP | 9-297348 | 11/1997 |
| JP | 2004-289383 | 10/2004 |
| JP | 2005-215040 | 8/2005 |
| JP | 2005-338352 | 12/2005 |
| JP | 2007-121896 | 5/2007 |

OTHER PUBLICATIONS

Japanese Office Action for corresponding JP Application No. 2007-140114, Oct. 18, 2011.

Japanese Office Action for corresponding JP Application No. 2007-140114, Apr. 10, 2012.

* cited by examiner 47  49

48

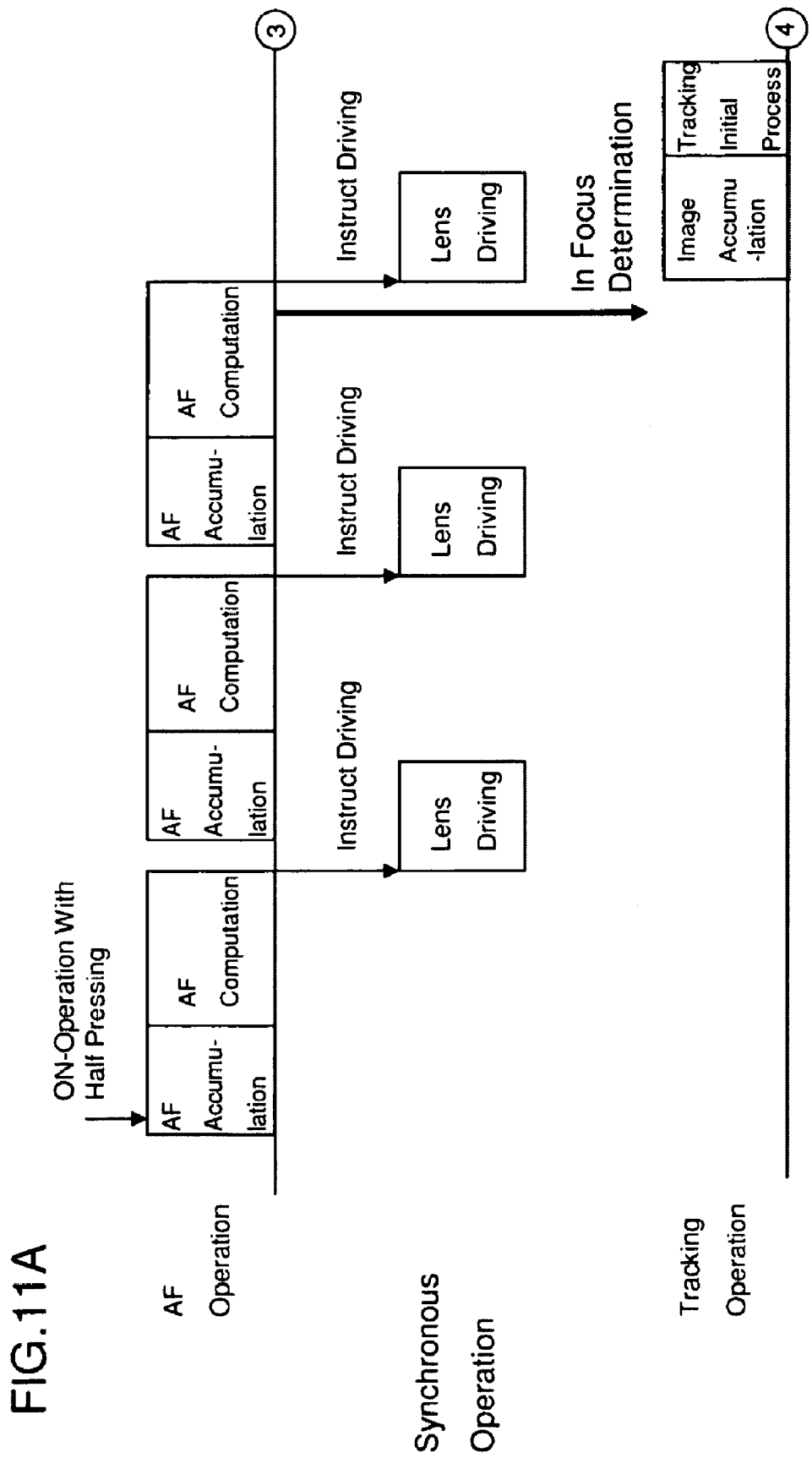

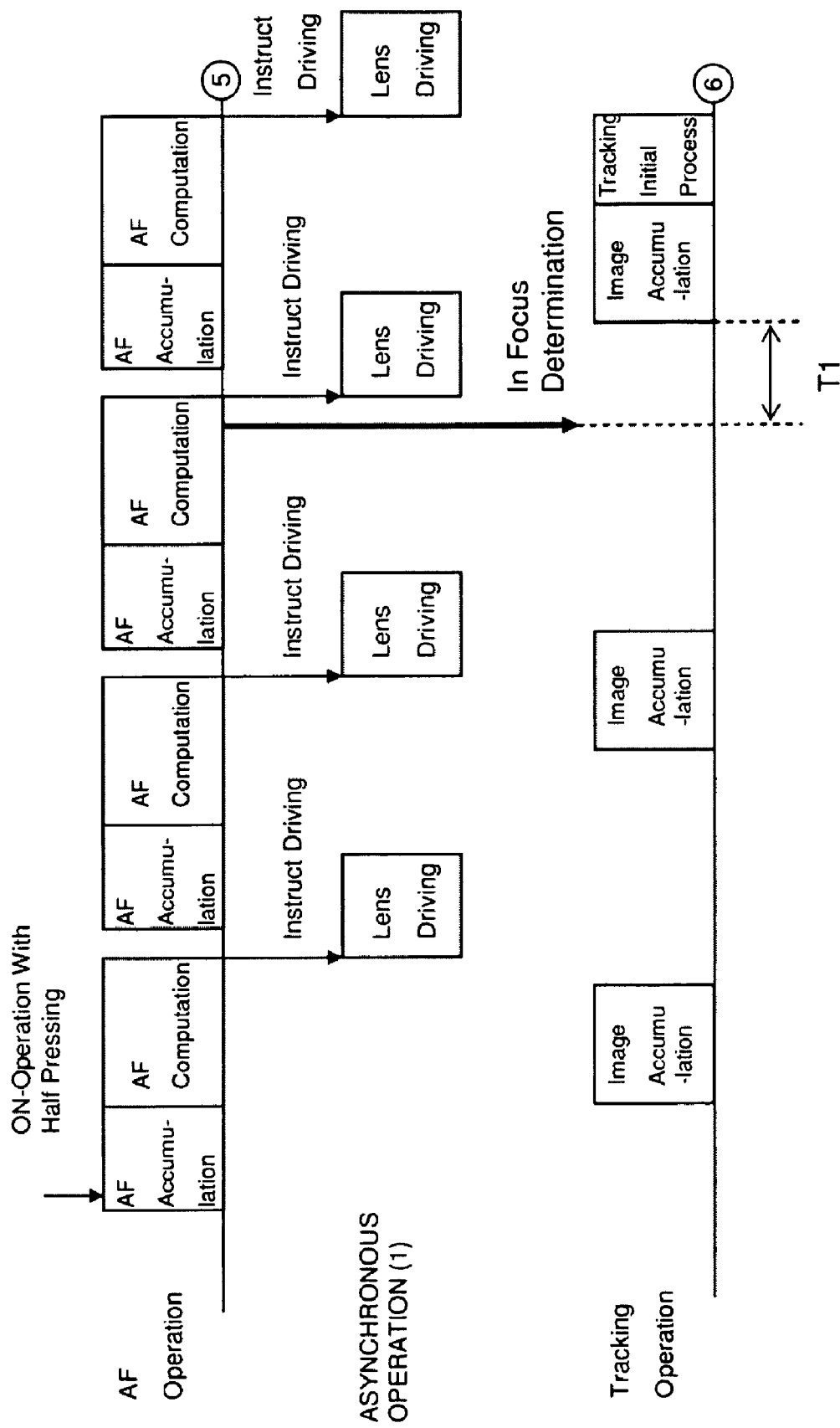

IMAGE TRACKING APPARATUS AND TRACKING EVALUATION METHOD

CROSS-REFERENCE TO RELATED APPLICATIONS

The present application claims priority under 35 U.S.C. §119 to Japanese Patent Application No. 2007-140114, filed May 28, 2007. The contents of this application are incorporated herein by reference in their entirety.

BACKGROUND OF THE INVENTION

1. Field of the Invention

The present invention relates to an image apparatus and an evaluation method.

2. Discussion of the Background

There is known an autofocusing system having an autofocusing (AF) function of detecting defocus amounts of a photographic lens in a plurality of focus detection areas set within a shooting screen and driving the photographic lens to an in-focus position based on the defocus amount in any one of the focus detection areas, and an image tracking function of storing an image of a subject (an object), which is included in a captured image and is to be tracked, as a template image (reference image) and tracking the object, i.e., the tracking target, while performing a search to find a position of an image, which is the same as or similar to the template image, in repeatedly captured images, wherein the focus detection area at an in-screen position obtained by an image tracking result is selected and the photographic lens is driven to an in-focus position based on the defocus amount in the selected focus detection area. Japanese Unexamined Patent Application Publication No. 2005-215040 discloses such an autofocusing system. The contents of this publication are incorporated herein by reference in their entirety.

However, when a photographer instructs the start of tracking of a shooting target, a photographic lens is not always focused at a target object. In the case of a lens having a long focal length, for example, if there is just a slight difference between a setting distance set by a range ring for the lens and an actual shooting distance, the shooting target is photographed in a substantially blurred state. When the tracking is started in such a state, a blurred image of the shooting target is employed as the template image. As a result, the target object is lost during the tracking, or an object other than the target is falsely recognized as the tracking target, whereby tracking performance deteriorates.

SUMMARY OF THE INVENTION

According to one aspect of the present invention, an image apparatus includes a screen, a detecting unit, a determining unit, an acquiring unit and a control unit. The screen is configured to display an image formed by an optical system and at least one detection position superimposed onto the image. The detecting unit is configured to detect information regarding focus of the optical system at the detection position. The determining unit is connected to the detecting unit and configured to determine whether the information regarding the focus is within a predetermined range. The acquiring unit is connected to the determining unit and configured to acquire first image information at the detection position when the determining unit determines that the information regarding the focus is within the predetermined range. The control unit is connected to the acquiring unit and configured to evaluate arbitrary second image information in the screen using the first image information.

According to another aspect of the present invention, an evaluation method includes displaying in a screen an image formed by an optical system, displaying at least one detection position superimposed onto the image, detecting information regarding focus of the optical system at the at least one detection position, acquiring first image information at the at least one detection position when the detected information is within a predetermined range, acquiring arbitrary image information in the screen as second image information, and evaluating the second image information using the first image information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11A and 11B are timing charts showing an autofocusing (AF) operation and an image tracking operation according to the embodiment; and FIGS. 12A to 12D are timing charts showing an autofocusing (AF) operation and an image tracking operation according to a modification.

DESCRIPTION OF THE EMBODIMENTS

Figure 1:
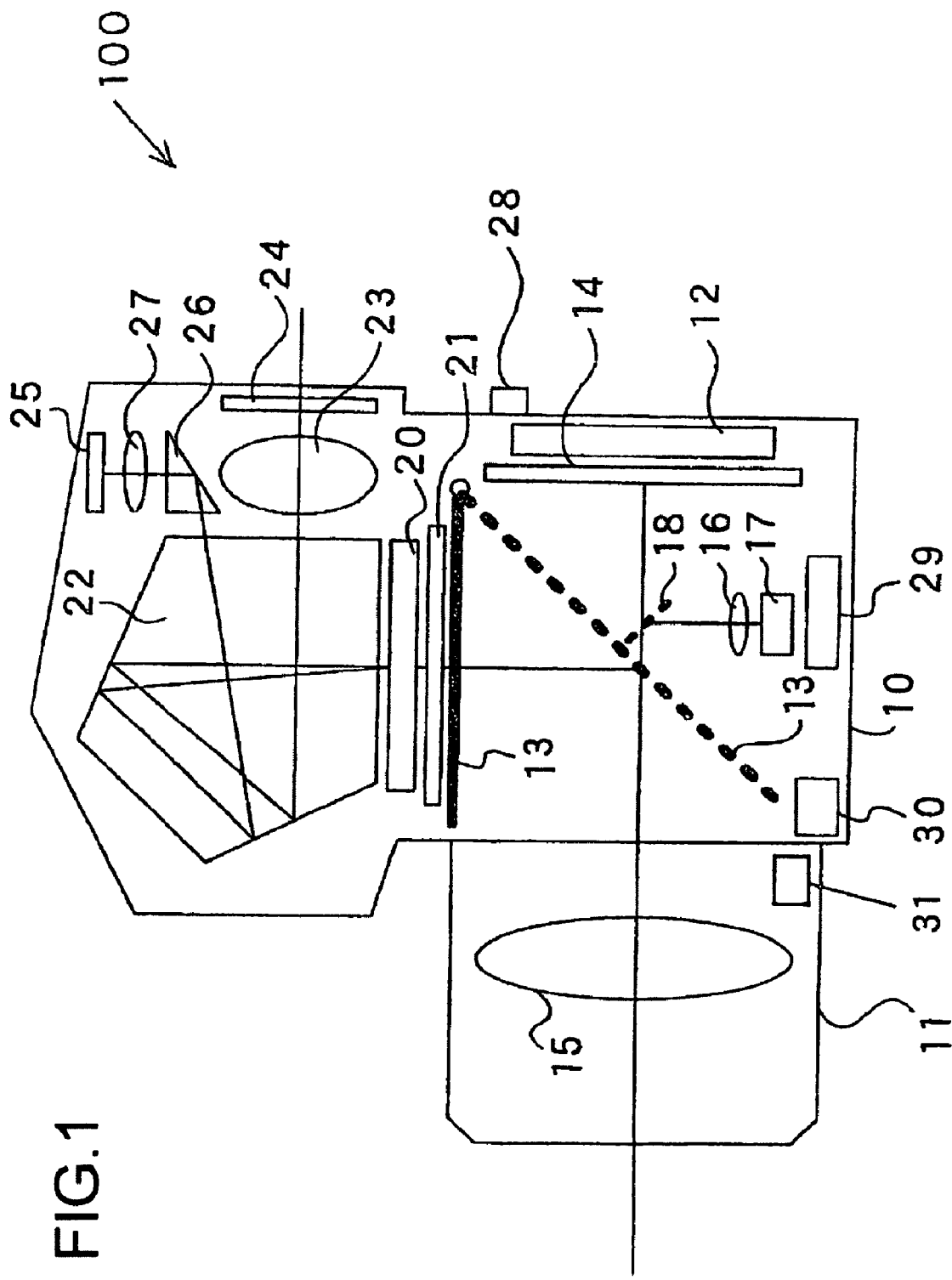
FIG. 1 is a schematic view showing the construction of an image-taking apparatus (single-lens reflex digital still camera) equipped with an object tracking device according to one embodiment of the present invention.

The embodiments will now be described with reference to the accompanying drawings, wherein like reference numerals designate corresponding or identical elements throughout the various drawings.

One embodiment of an image-taking apparatus (single-reflex digital still camera) equipped with an image tracking device having an autofocusing (AF) function of detecting defocus amounts of a photographic lens in a plurality of focus detection areas set within a shooting screen and driving the photographic lens to an in-focus position based on the defocus amount in any one of the focus detection areas, and an image tracking function of storing an image of an object (subject), which is included in a captured image and is to be tracked, as a template image (reference image) and tracking the object, i.e., the tracking target, while performing a search to find a position of an image, which is the same as or similar to the template image, in repeatedly captured images (i.e., while performing template matching), wherein the focus detection area at an in-screen position obtained by an image tracking result is selected and the photographic lens is driven to an in-focus position based on the defocus amount in the selected focus detection area.

FIG. 1 shows the construction of an image-taking apparatus (single-lens reflex digital still camera) 100 equipped with an object tracking device according to the embodiment. An interchangeable lens 11 is mounted to a camera body 10 in an interchangeable manner. The camera body 10 includes a first image-sensing device 12 for capturing an object image and recording the image. The first image-sensing device 12 can be constituted by, e.g., a CCD or a CMOS. At the time of shooting, a quick return mirror 13 is retracted to a position, indicated by solid lines, which is located outside a photographic optical path, and a shutter 14 is released so that the object image is focused by the photographic lens 15 on a light receiving surface of the first image-sensing device 12.

A focus detection optical system 16 and a ranging device 17 for cooperatively detecting a focus adjusted state of the photographic lens 15 are disposed at the bottom of the camera body 10. The illustrated embodiment represents the case using a focus detection method with a pupil-division phase difference detection technique. Before the shooting, the quick return mirror 13 is set to a position, indicated by broken lines, which is located within the photographic optical path. Paired beams of focus detection light from the photographic lens 15 pass through a half-mirror portion of the quick return mirror 13, and after being reflected by a sub-mirror 18, they are introduced to the focus detection optical system 16 and the ranging device 17. The focus detection optical system 16 introduces the paired beams of focus detection light having entered through the photographic lens 15 to a light receiving surface of the ranging device 17, thereby focusing a pair of optical images thereon. The ranging device 17 includes a pair of CCD line sensors, for example, and outputs focus detection signals corresponding to the pair of optical images.

A finder optical system is disposed at the top of the camera body 10. Before the shooting, since the quick return mirror 13 is set in the position, indicated by broken lines, which is located within the photographic optical path, light from the object, having entered through the photographic lens 15, is introduced to a focus plate 20 and an image of the object is focused on the focus plate 20. A liquid crystal display device 21 displays not only information, such as focus detection area marks, in a superimposing relation to the object image focused on the focus plate 20, but also various items of shooting information, such as an exposure value, at a position outside the object image. The object image on the focus plate 20 is introduced to an ocular window 24 through a pentagonal roof prism 22 and an ocular lens 23 such that the photographer can visually confirm the object image.

Further, the finder optical system disposed at the top of the camera body 10 includes a second image-sensing device 25 for capturing the object image for the purposes of object tracking and photometry. The second image-sensing device 25 will be described in detail later. The object image focused on the focus plate 20 is refocused on a light receiving surface of the second image-sensing device 25 through the pentagonal roof prism 22, a prism 26, and an imaging lens 27. The second image-sensing device 25 outputs an image signal corresponding to the object image.

In addition, the camera body 10 includes an operating member 28, a control device 29, and a lens driving device 30. The operating member 28 includes switches and selectors for operating the camera 100, such as a shutter button and a focus detection area select switch. The control device 29 is constituted by a CPU and peripheral components, and it executes various kinds of control and processing necessary for the camera 100. The lens driving device 30 is constituted by a motor and a drive circuit, and it performs focus adjustment of the photographic lens 15 through a lens driving mechanism (not shown). The interchangeable lens 11 includes a lens ROM 31 for storing lens information, such as the focal length, the full F-number and the aperture value (f-stop number) of the photographic lens 15, along with a conversion coefficient between an amount of image deviation and a defocus amount. The control device 29 can read the lens information from the lens ROM 31 through a contact (not shown) provided in a lens mount.

Figure 2:
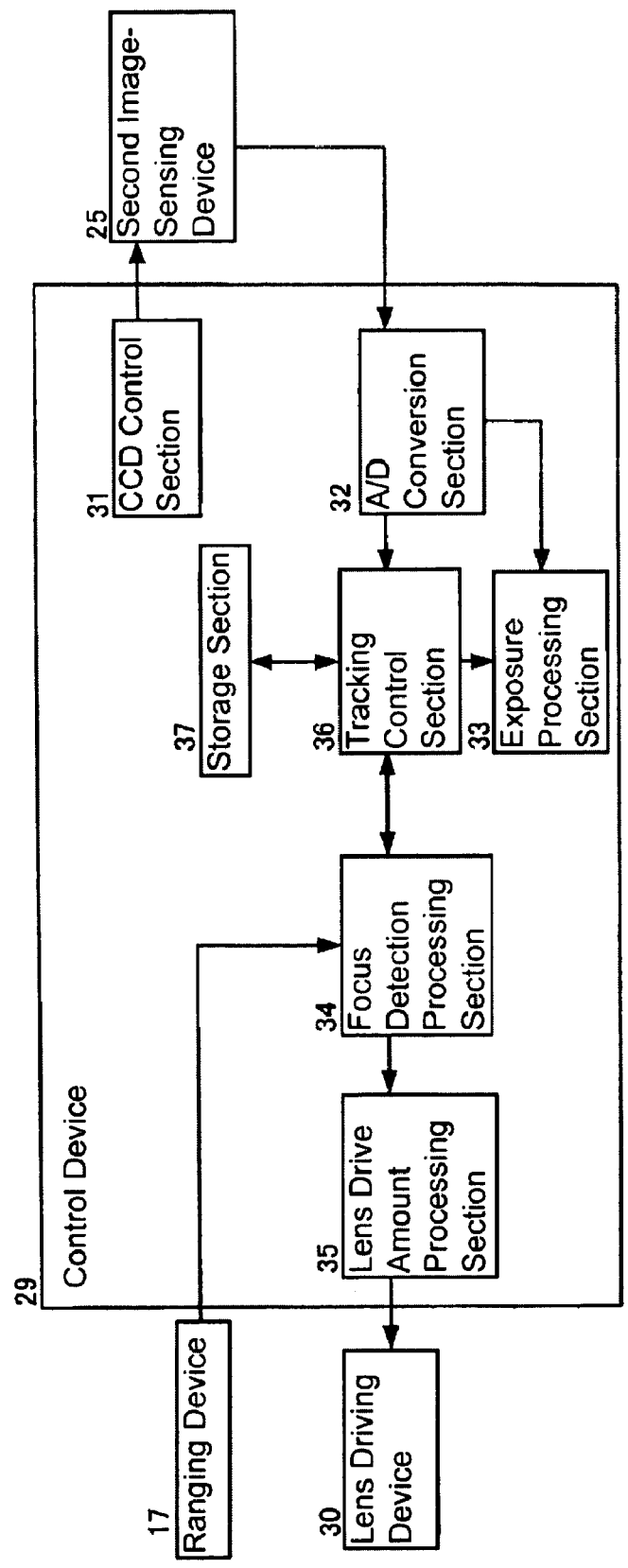
FIG. 2 is a block diagram showing the detailed construction of a control device.

FIG. 2 shows the detailed configuration of the control device 29. It is to be noted that control functions not directly related to the embodiment of the present invention are not shown and a description of those control functions is omitted here. The control device 29 includes various control sections which are constituted by software installed in a microcomputer. A CCD control section 31 controls accumulation and read of charges in and from the second image-sensing device 25. An A/D conversion section 32 converts an analog image signal output from the second image-sensing device 25 to a digital image signal that represents image information. An exposure processing section 33 calculates an exposure value based on the image signal captured by the second image-sensing device 25.

A focus detection processing section 34 detects a focus adjusted state, i.e., a defocus amount in this embodiment, of the photographic lens 15 based on the focus detection signals corresponding to the pair of optical images, which are output from the ranging device 17. Though described in detail later, the focus detection areas are set, as focus detection positions, at a plurality of positions within a shooting screen formed by the photographic lens 15. The ranging device 17 outputs the focus detection signals corresponding to the pair of optical images for each of the focus detection areas, and the focus detection processing section 34 detects the defocus amount based on the focus detection signals corresponding to the pair of optical images for each of the focus detection areas. A lens drive amount processing section 35 converts the detected defocus amount to a lens drive amount. In accordance with the lens drive amount, the lens driving device 30 drives a focusing lens (not shown) in the photographic lens 15 to perform the focus adjustment.

A tracking control section 36 stores, as the template image, one of the object images captured by the second image-sensing device 25, which corresponds to a tracking target position manually designated by the photographer or a tracking target position automatically set by the camera 100, in a storage section 37 (described later). Also, the tracking control section 36 commands the focus detection processing section 34 to detect the defocus amount of the photographic lens 15 at the tracking target position. Further, the tracking control section 36 performs a search to find an image area, which is matched with or similar to the template image, in images repeatedly captured thereafter, thus recognizing the target position, and detects the defocus amount of the photographic lens 15 at the focus detection position corresponding to the image area which is matched with or similar to the template image. When the detected result is compared with the defocus amount previously detected in the tracking target area and the compared result does not indicate a significant change, focusing control is performed at the focus detection position corresponding to the found image area. By repeating the above-described procedures, a particular object is tracked. The storage section 37 stores not only information such as the template image under the tracking by the tracking control section 36 and the defocus amounts, but also the lens information, such as the focal length, the full F-number and the aperture value (f-stop number) of the photographic lens 15, along with the conversion coefficient between an amount of image deviation and a defocus amount, which are read from the lens ROM 31 in the interchangeable lens 11.

Figure 3:
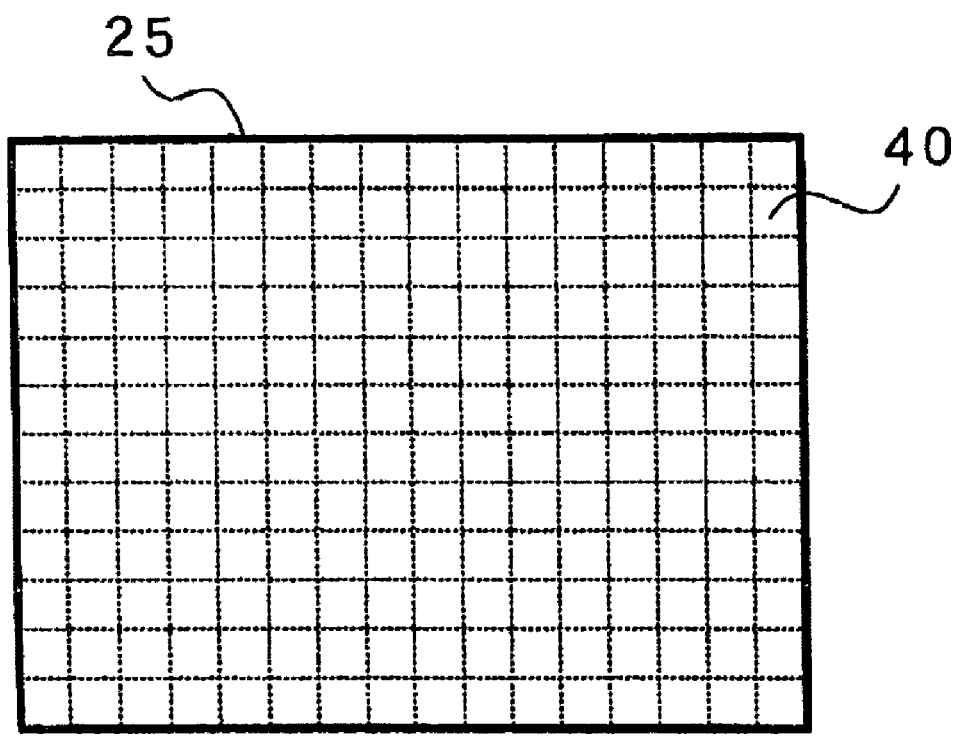
FIG. 3 is a front view showing the detailed construction of a second image-sensing device.
Figure 4:
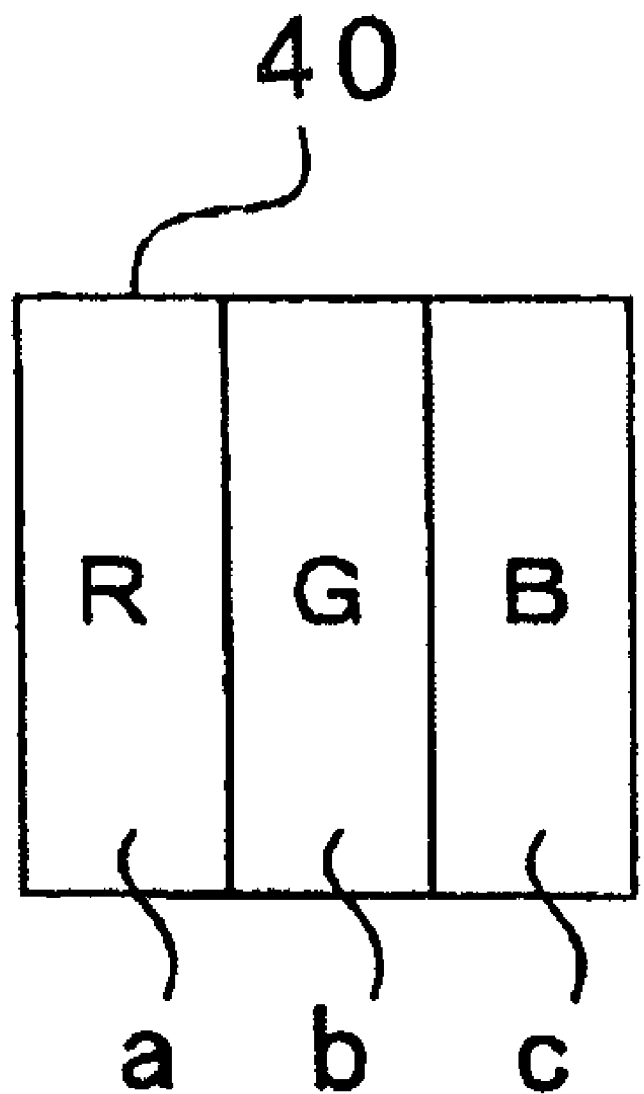
FIG. 4 illustrates the pixel arrangement of the second image-sensing device.

FIG. 3 is a front view showing the detailed construction of the second image-sensing device 25. The second image-sensing device 25 has a plurality of pixels (photoelectric transducers) 40 arrayed in a matrix pattern (16 in the horizontal direction×12 in the vertical direction=192 in the illustrated embodiment). As shown in FIG. 4, each pixel 40 is divided into three portions 40a, 40b and 40c. Primary color filters in red R, green G and blue B are disposed respectively in the three portions 40a, 40b and 40c. Therefore, each pixel 40 can output RGB signals of the object image.

Figure 5:
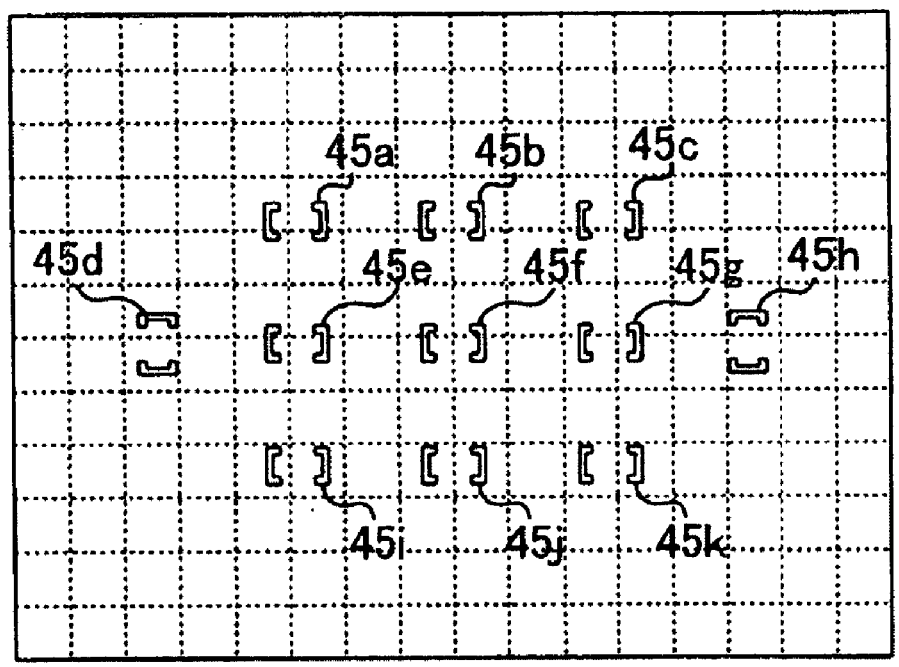
FIG. 5 is an explanatory view for explaining an object tracking method according to the embodiment.
Figure 6A:
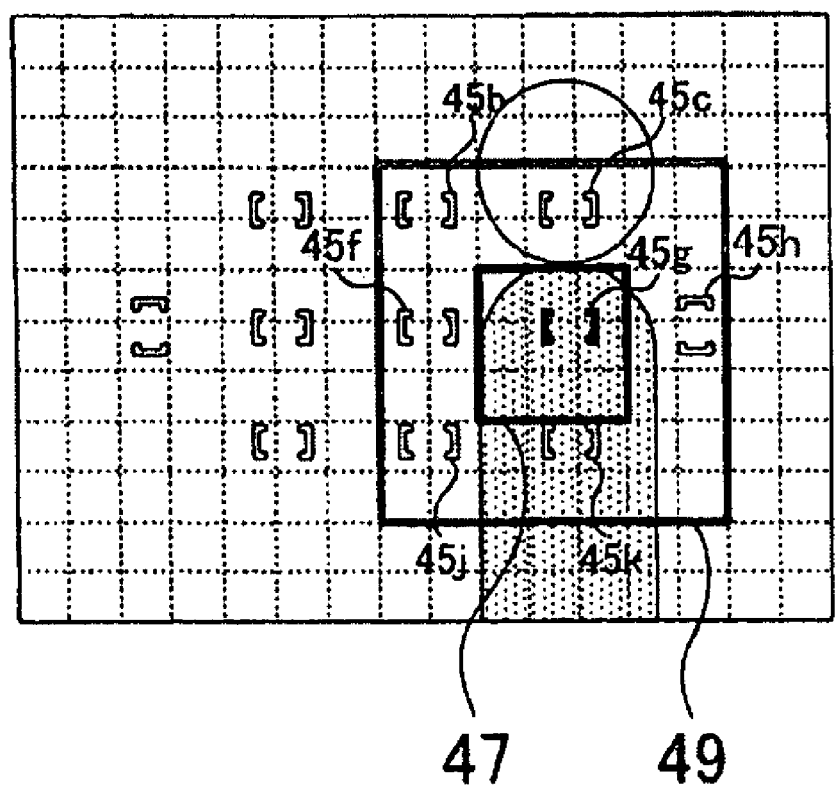
FIGS. 6A and 6B are explanatory views for explaining the object tracking method according to the embodiment.
Figure 6B:
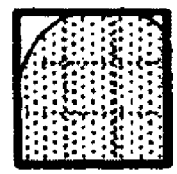
Figure 7:
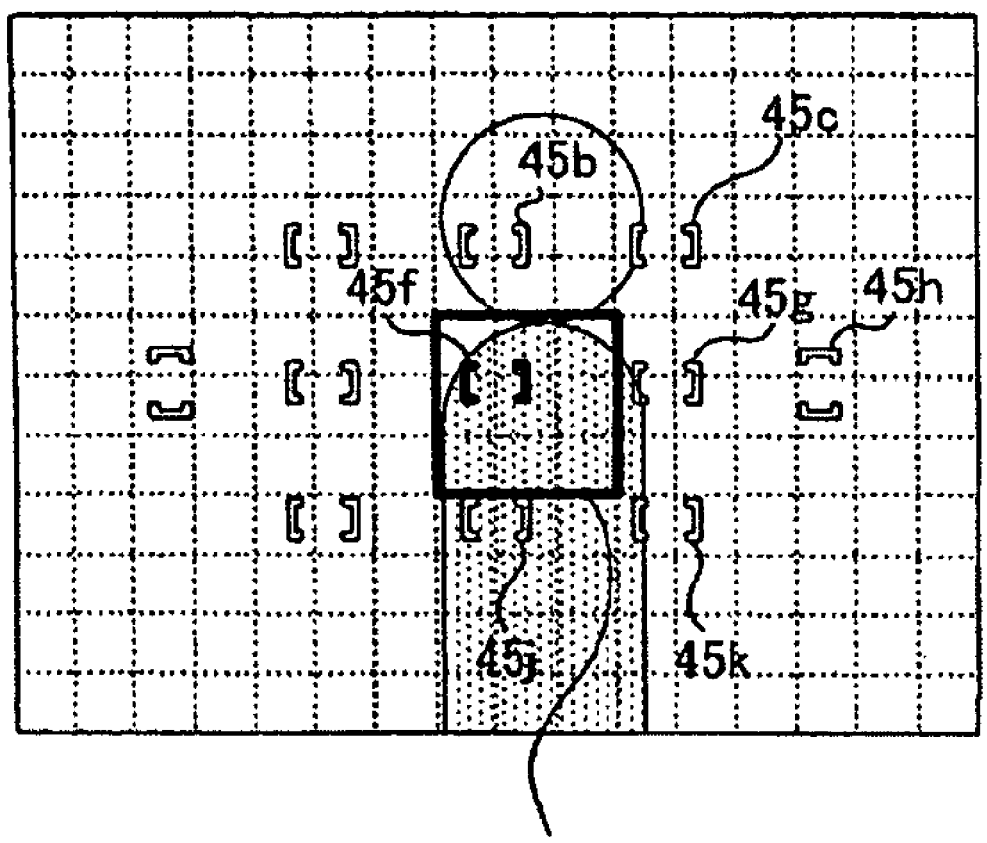
FIG. 7 is an explanatory view for explaining the object tracking method according to the embodiment.
Figure 9:
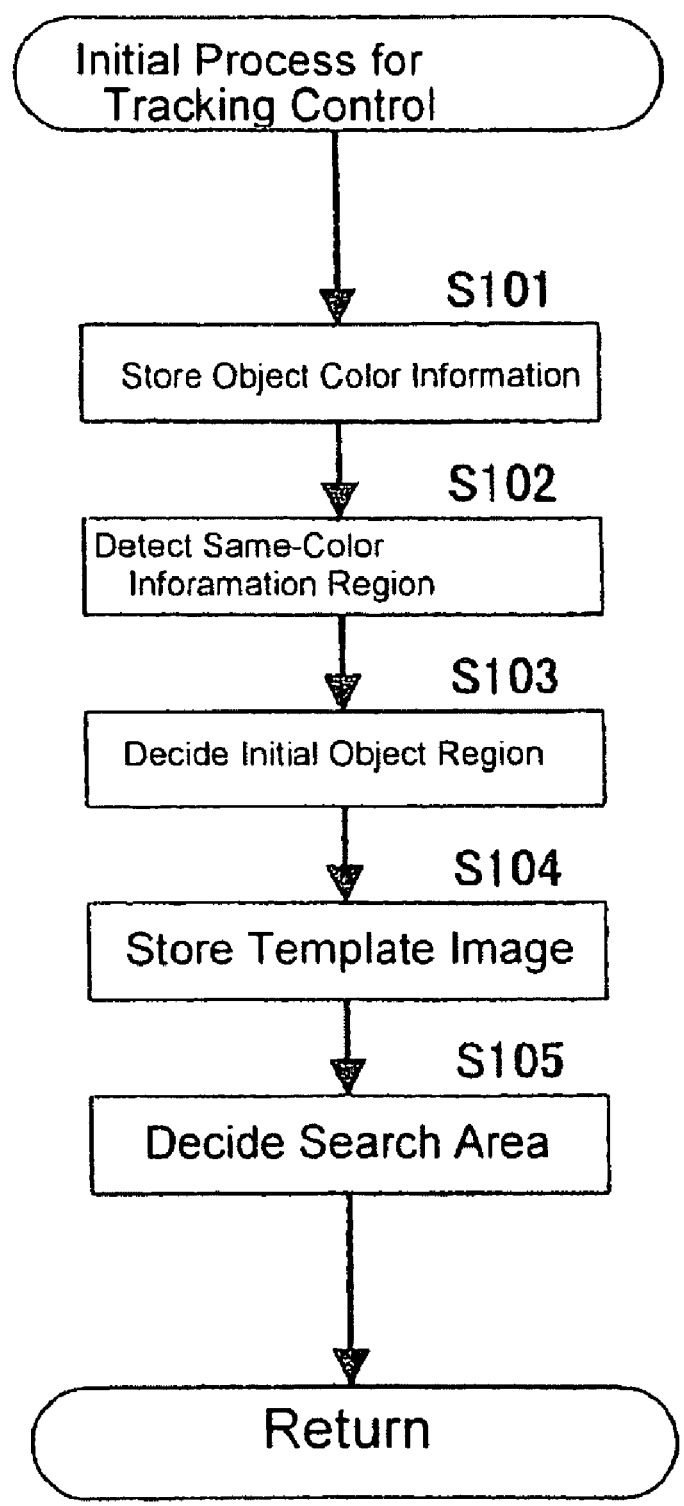
FIG. 9 is a flowchart showing the object tracking process according to the embodiment.
Figure 10:
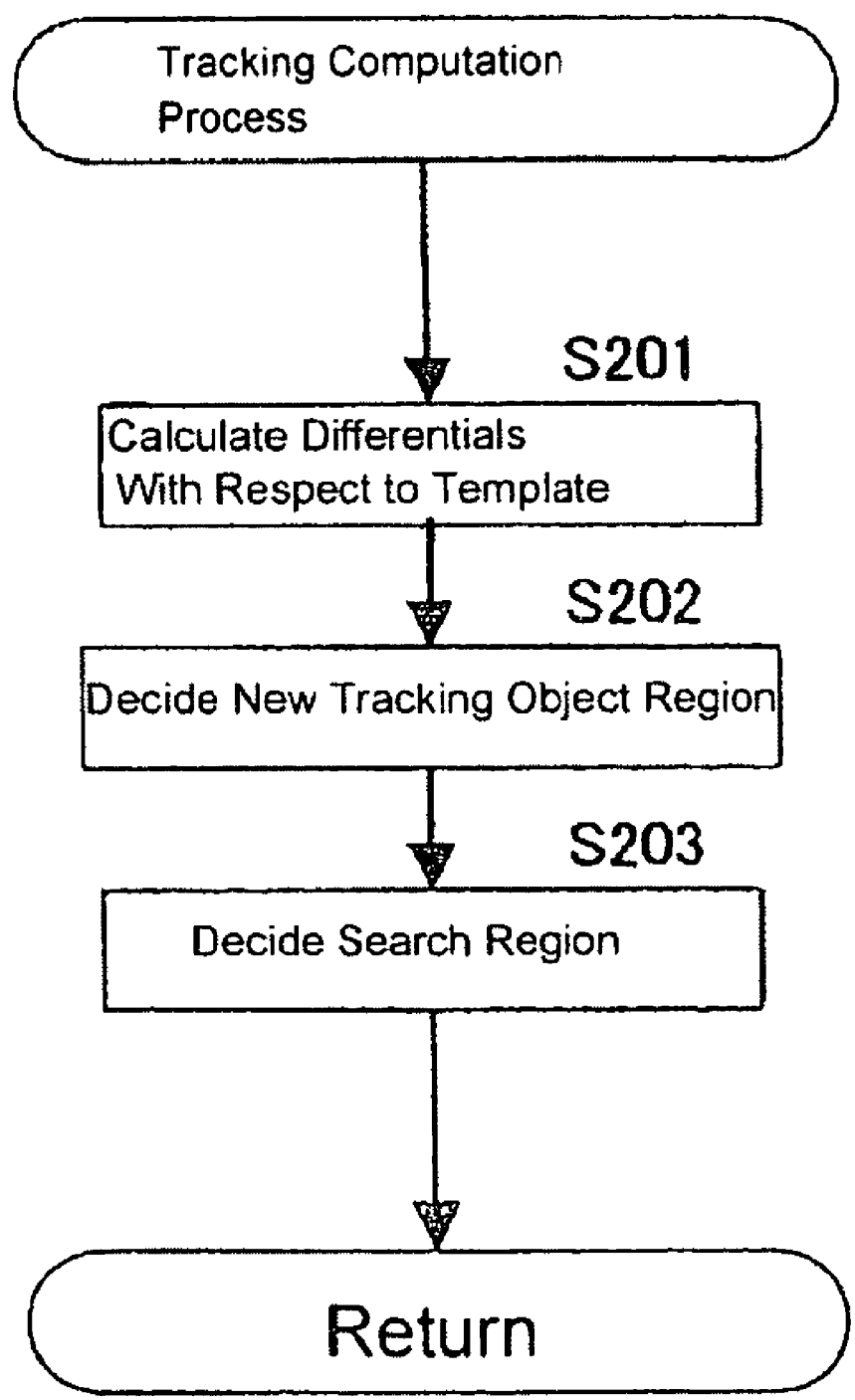
FIG. 10 is a flowchart showing the object tracking process according to the embodiment.
Figure 11B:
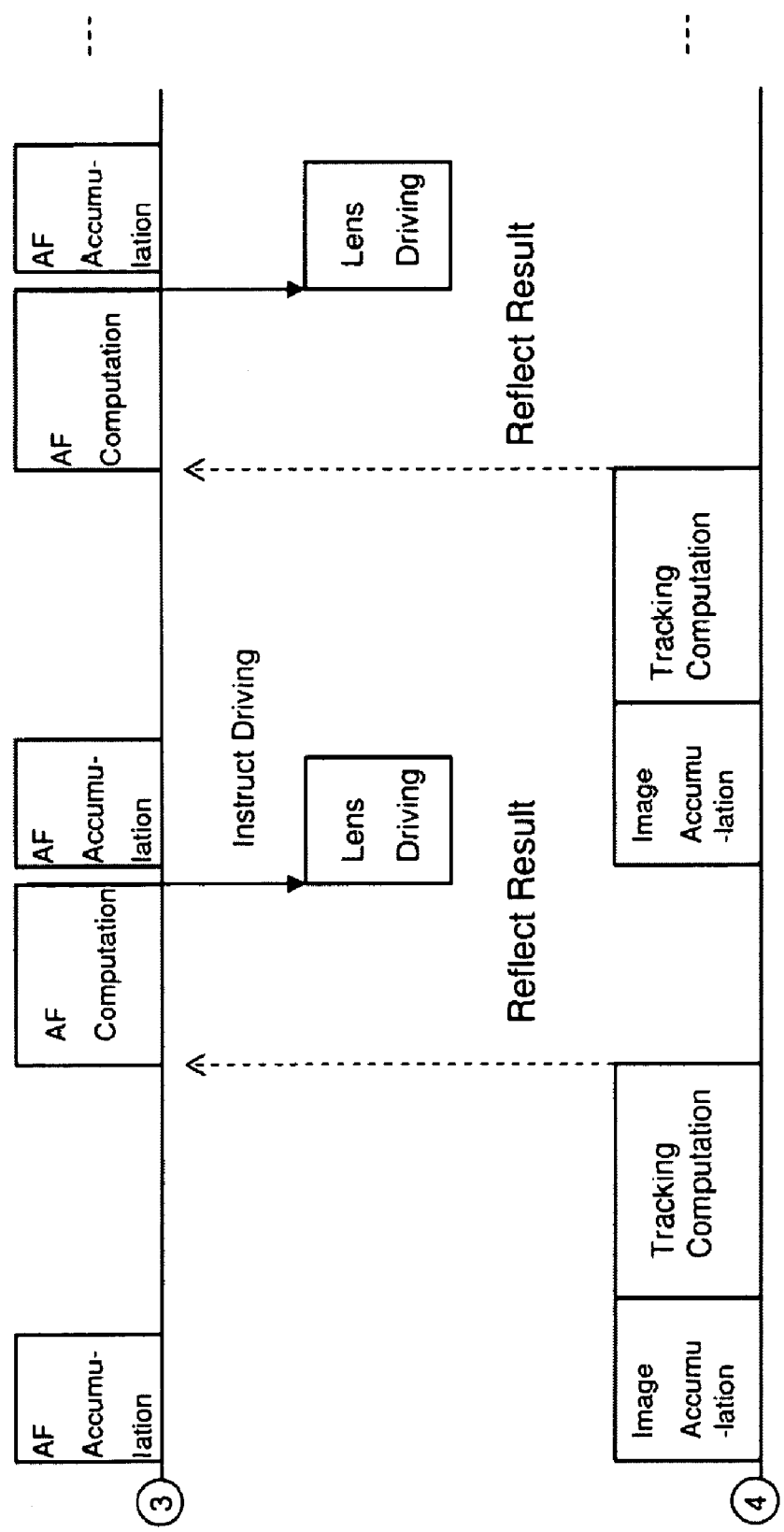
Figure 12B:
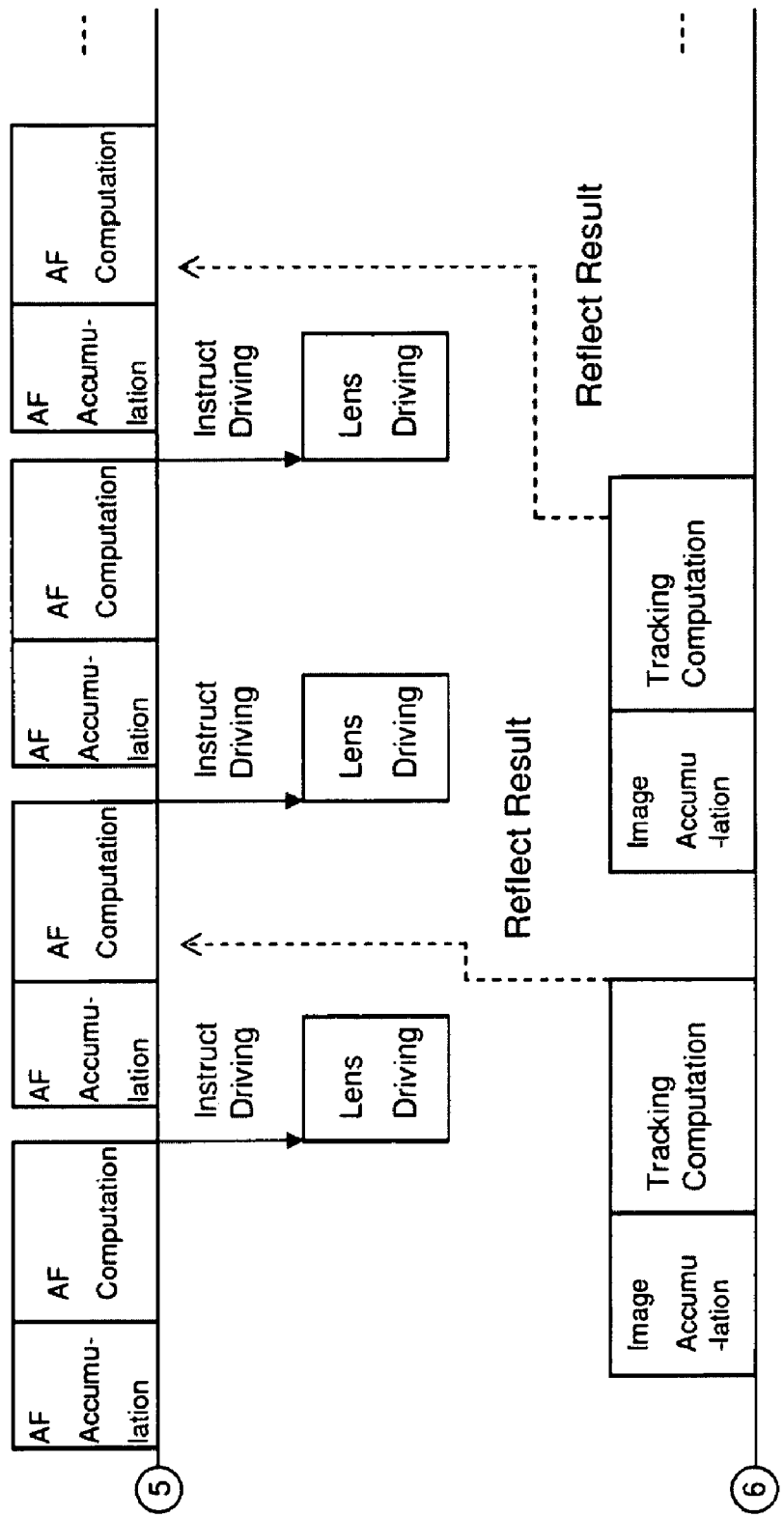
Figure 12C:
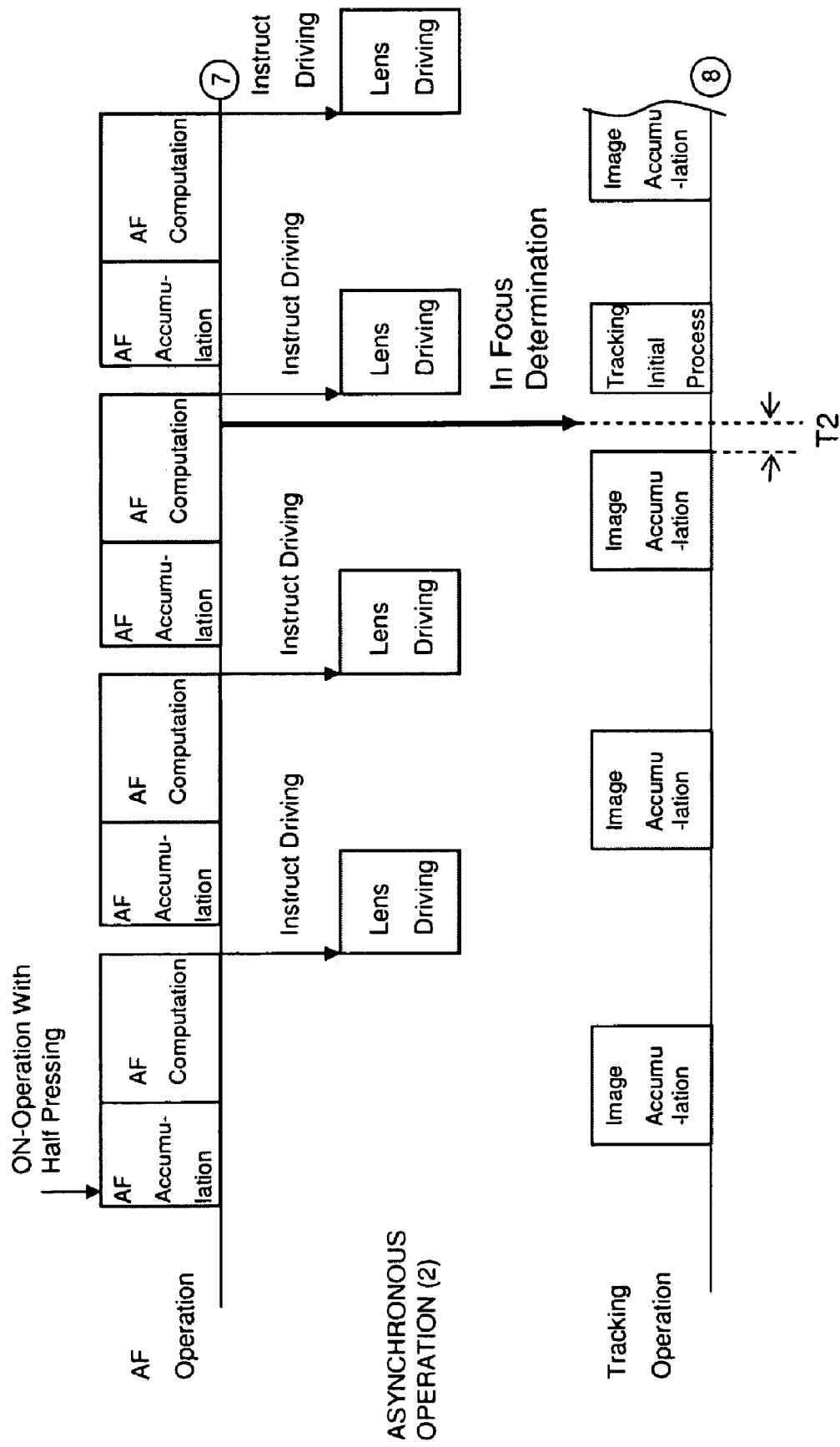
Figure 12D:
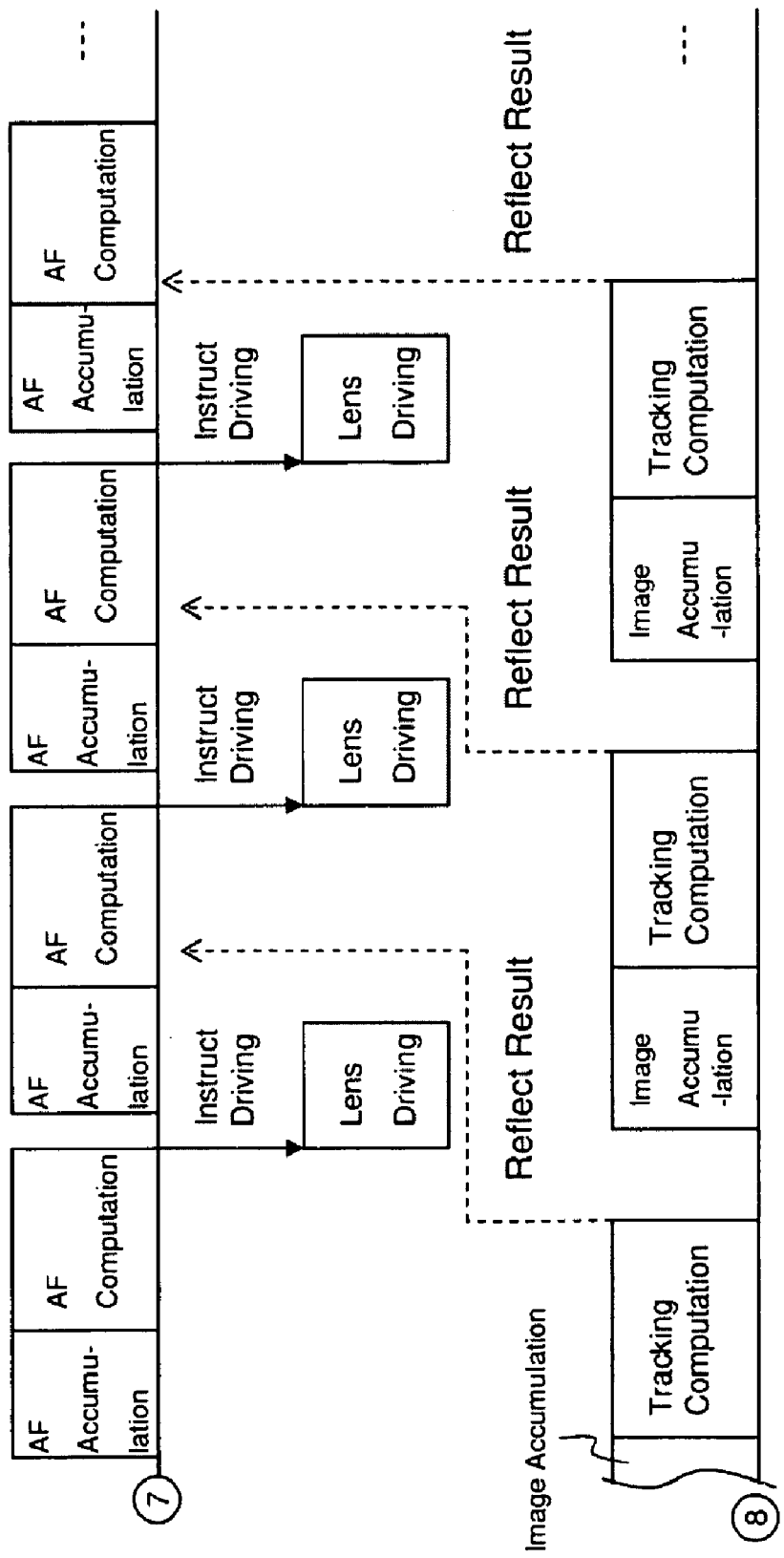

Next, an object tracking operation according to one embodiment will be described. FIGS. 5-7 are explanatory views for explaining the object tracking operation according to the embodiment, and FIGS. 8-10 are flowcharts showing an object tracking process according to the embodiment. FIGS. 11A and 11B are timing charts showing an automatic focusing (AF) operation and an image tracking operation. The control device 29 starts the object tracking operation when the photographer half-presses the shutter button of the operating member 28 after the photographer has manually designated the tracking target position within the object image captured by the second image-sensing device 25, or after the camera 100 has automatically set the tracking target position.

Other than when a photograph is taken by fully pressing the shutter button, the quick return mirror 13 is set in the position, indicated by broken lines in FIG. 1, which is located within the photographic optical path, the light from the object, having entered through the photographic lens 15, is focused on the focus plate 20. The object image on the focus plate 20 is introduced to the second image-sensing device 25 through the pentagonal roof prism 22, the prism 26, and the imaging lens 27. In such a manner, the object image is repeatedly output from the second image-sensing device 25.

The focus detection areas are set at a plurality of positions within the shooting screen formed by the photographic lens 15, and the liquid crystal display device 21 displays area marks in a superimposing relation to the object image on the focus plate 20. In the illustrated embodiment, as shown in FIG. 5, focus detection areas 45a-45k are set at eleven positions within the shooting screen. Further, when an arbitrary area is selected by the focus detection area select switch of the operating member 28, the mark corresponding to the selected area is displayed in an illuminated state.

Figure 8A:
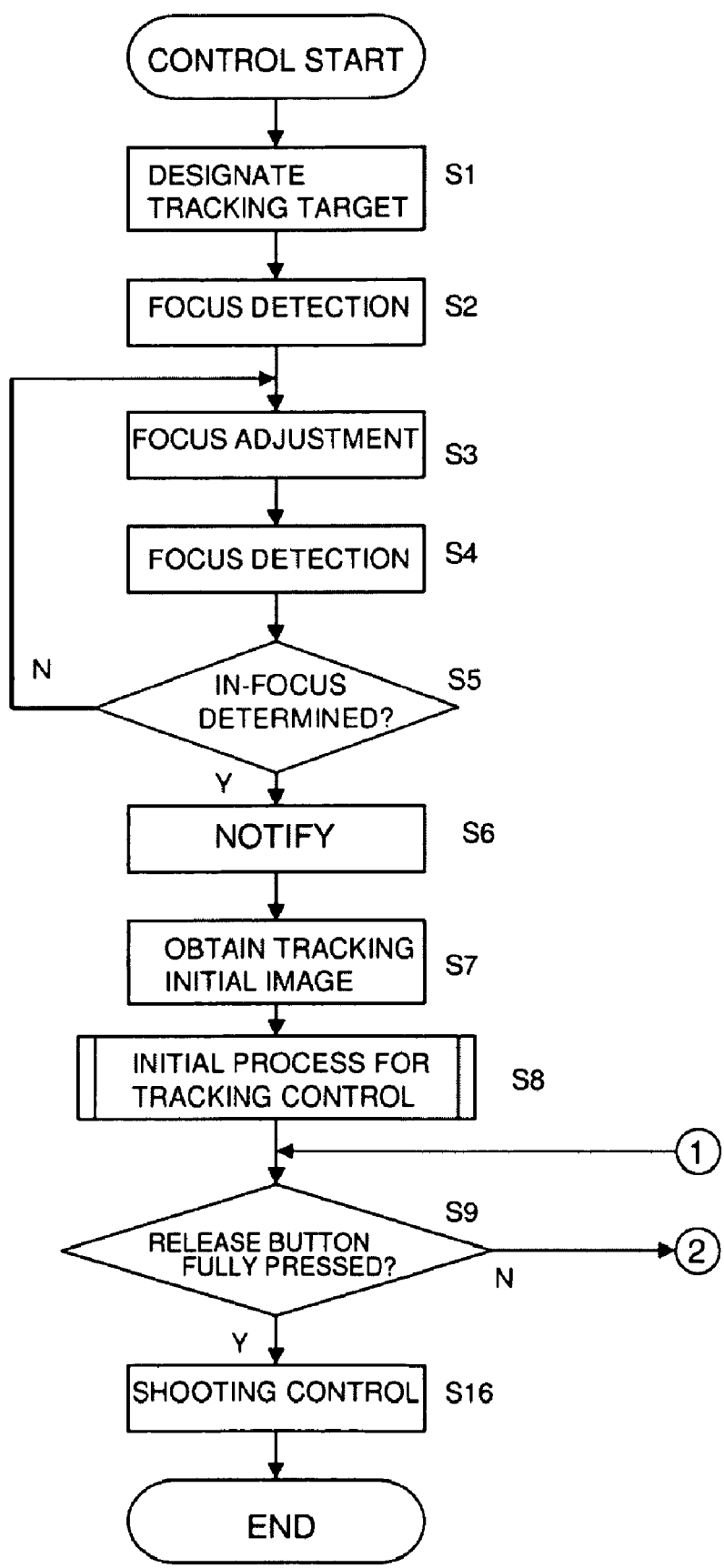
FIGS. 8A and 8B are flowcharts showing an object tracking process according to the embodiment.

Assuming, for example, that the focus detection area 45g corresponding to the image of the object as the tracking target is selected in step 1 of FIG. 8A by the focus detection area select switch of the operating member 28, and the mark corresponding to the focus detection area 45g is illuminated (indicated by the solid black mark in the illustrated embodiment). When the shutter button of the operating member 28 is half-pressed in such a state, the object to be tracked can be designated. Also, the control device 29 starts the object tracking process in response to the half-pressing operation.

Instead of manually designating the tracking target object by the photographer, the camera 100 may automatically set the tracking target object. For example, the automatic setting can be performed by using an object face recognition technique through the steps of detecting a face portion of the object from the captured image and setting the detected face portion as the tracking target, or by using a method of setting, as the tracking target, the object in the focus detection area which indicates the smallest one of the defocus amounts detected in the plurality of focus detection areas within the shooting screen.

In step 2, the pair of optical images corresponding to the selected focus detection area (45g in this embodiment) are obtained by the ranging device 17, and the focus adjusted state, i.e., the defocus amount, of the photographic lens 15 in the selected focus detection area (45g) is detected based on the pair of optical images. In step 3, the defocus amount detected in the selected focus detection area (45g) is converted to a lens drive amount, and the photographic lens 15 is driven by the lens driving device 30 for focus adjustment. In next step 4, the pair of optical images corresponding to the selected focus detection area (45g) are obtained by the ranging device 17, and the defocus amount of the photographic lens 15 in the selected focus detection area (45g) is detected based on the pair of optical images.

In step 5, it is determined whether the photographic lens 15 is in focus with the tracking target object in the selected focus detection area (45g). Stated another way, if the defocus amount detected in the selected focus detection area (45g) after the focus adjustment is within a preset threshold for making the in-focus determination, it is determined that the photographic lens 15 is in focus with the tracking target object in the selected focus detection area (45g).

The threshold for making the in-focus determination may be set to the same value as that of a threshold used in the automatic focusing (AF) function. Alternatively, if the template image (reference image) used in the image tracking function is obtained as an image which is sharp at such a level as ensuring the predetermined tracking performance, the threshold for making the in-focus determination may be set to have an absolute value larger than that of the threshold used in the AF function so as to provide a wider range in which the in-focus is determined.

In the case of the photographic lens 15 having a longer focal length, if there is just a slight difference between a setting distance set by a range ring for the lens and an actual shooting distance, the shooting target is photographed in a significantly blurred state. When the tracking is started in such a state, a blurred image of the shooting target is employed as the template image. To avoid such a problem, corresponding to the focal length of the photographic lens 15, obtained from the lens ROM 31, which has a larger value, the threshold may be set to a smaller value so that a sharper image of the tracking target is obtained.

Further, an optimum threshold may be set depending on a selected shooting mode. For example, when a sport shooting mode is selected to take a sport photograph of a quickly moving object, a photographed image is more apt to blur due to shake of the camera body held by the hand and motion of the object itself. In such a case, therefore, the threshold may be set to a smaller value than that set when a normal shooting mode is selected, to thereby provide an image being in focus with the tracking object.

If it is determined in step 5 that the defocus amount in the selected focus detection area (45g) is larger than the preset threshold for making the in-focus determination and the photographic lens 15 is not in focus with the tracking target object, the control flow returns to step 3 to repeat the above-described focus detection and focus adjustment. If it is determined that the photographic lens 15 is in focus with the tracking target object, the control flow proceeds to step 6 in which the liquid crystal display device 21 displays the fact that the designated tracking target object is in focus, and in which voice guide is provided through a speaker (not shown). The process of step 6 for displaying the in-focus of the tracking target object and providing the voice guide may be dispensed with.

In step 7, a tracking initial image is obtained from the second image-sensing device 25. In next step 8, an initial process for the tracking control, shown in FIG. 9, is executed. In step 101 of FIG. 9, an image at a position corresponding to the position of the selected focus detection area 45g in the tracking initial image, which is obtained from the second image-sensing device 25, is stored as object color information. In step 102, in peripheral part around the selected focus detection area (45g), a same-color information region having similar color information to the object color information is detected as shown in FIG. 6(*a*). In next step 103, the same-color information region is set as an initial tracking object region 47. In step 104, an image of the tracking object region 47 within the initial tracking image is stored in the storage section 37 as a template image 48 (see FIG. 6(*b*)) used in the image tracking process. In step 105, a region obtained by enlarging the tracking object region 47 in size corresponding to the number of predetermined pixels (two in the illustrated embodiment) in the up-and-down directions and the right-and-left directions with the region 47 being at a center is set as a search region 49. Thereafter, the control flow returns to step 9 of FIG. 8A.

While the illustrated embodiment represents an example in which the tracking target region 47 is decided based on the object color information, the tracking object region 47 may be decided based on brightness information. Also, the region size may be decided as a constant size of 4×4 pixels for simplification of the process, or may be decided depending on the focal length information of the photographic lens 15.

In step 9 of FIG. 8A after the initial process for the tracking control, it is confirmed whether the shutter button of the operating member 28 has been fully pressed, i.e., whether the shutter release operation has been performed. If the shutter release operation has been performed, the control flow proceeds to step 16 in which the mirror 13 is lifted up and the shutter 14 is released, thereby shooting an image by the first image-sensing device 12. On the other hand, if the shutter release operation is not performed, the control flow proceeds to step 10 in which next image information is obtained from the second image-sensing device 25 and the pair of optical images for the focus detection are obtained by the ranging device 17 for each of the focus detection areas 45a-45k.

In step 11, a tracking computation process shown in FIG. 10 is executed. In step 201 of FIG. 10, a region having the same size as the template image 48 is successively cut out from the search region 49 in a tracking next image. A difference in image information between the cut-out image and the template image 48 per corresponding pixel is calculated and the total sum of the differences for all the pixels is obtained. At that time, for example, when the difference in image information is provided by differences between the hues B and G and between the hues R and G for each pixel, the differences can be calculated by using the raw image signals output from the second image-sensing device 25 and pre-processing, such as white balancing and filtering, for the raw image signals is not required, whereby the tracking process can be simplified. Instead of the hue difference, a color difference per pixel may be calculated. When the tracking object region 47 is decided based on brightness information, a brightness difference per pixel may be calculated.

When the total sum of the differentials between each of all the images cut out from the search region 49 and the template image 48 has been calculated, one of the cut-out images is selected which has a minimum total sum value of the differentials among the calculation results, and the region of the selected cut-out image is decided as a new tracking object region 47, thus recognizing the target position. In step 203, a region obtained by enlarging the new tracking object region 47 in size corresponding to the number of predetermined pixels (two in the illustrated embodiment) in the up-and-down directions and the right-and-left directions with the region 47 being at a center is set as a new search region 49. Thereafter, the control flow returns to step 12 of FIG. 8B. A region set as the search region 49 may be an arbitrary region within the screen of the second image-sensing device 25. Such a region is preferably larger than the tracking object region 47 and, more preferably, it includes the focus detection area 45g in the tracking object region 47.

The control flow may additionally include a process of updating the image information of the template image 48 by using the image information of the newly decided tracking object region 47. In such a case, by adding 20% of the image information of the new tracking object region 47 to 80% of the image information of the template image 48, for example, the latest image information is updated a little by a little with respect to the image information of the template image 48 such that the tracking operation is able to more easily follow changes of the tracking object.

The foregoing embodiment has been described in connection with the case where the template image in the designated tracking object region is stored, the differentials in the image information per pixel with respect to the template image are calculated for regions in each of the repeatedly captured images, and the region having the minimum total sum value of the differentials is set as the tracking object region. However, the tracking computation method may be modified as follows. Image information in the surroundings of the tracking object region is stored along with the image information of the designated tracking object region. From each of the repeatedly captured images, a plurality of candidate regions for a new tracking object region are detected which have relatively small total sum values of the differentials with respect to the template image. Then, image information in the surroundings of each of the candidate regions is successively compared with the image information in the surroundings of the previous tracking object region, and the candidate region having a maximum coincidence is set as the new tracking object region. This modified method can prevent erroneous detection of the tracking target object and can improve the accuracy in tracking the object.

Figure 8B:
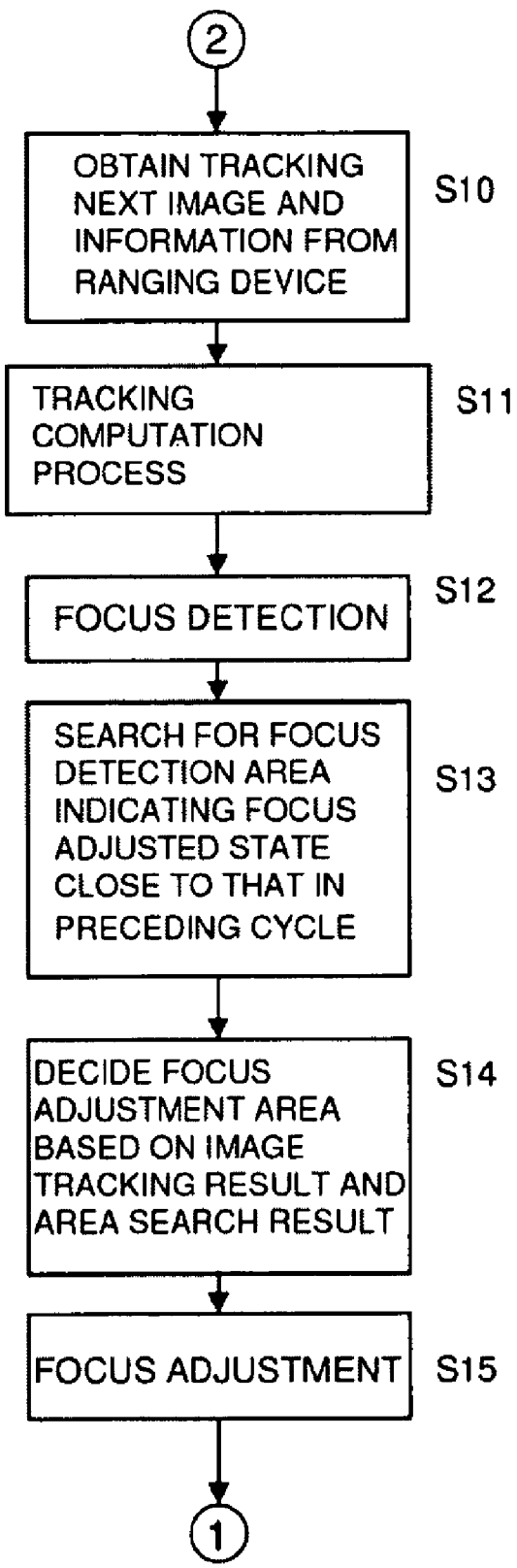

In step 12 of FIG. 8B after the return, the focus adjusted state, i.e., the defocus amount, of the photographic lens 15 in each of the set focus detection areas 45a-45k is detected based on the pair of optical images which have been obtained in step 10. In next step 13, based on defocus amounts of all the focus detection areas, a search is performed to find focus detection areas having the defocus amounts close to the defocus amount of the focus detection area which has been employed in the previous focus adjustment. Herein, as shown in FIG. 7, it is assumed, by way of example, that the focus detection areas 45b, 45f and 45j provide the defocus amounts close to the defocus amount of the focus detection area which has been employed in the previous focus adjustment.

In step 14, an area where the focus adjustment is to be performed is decided based on both the new tracking object region obtained as the image tracking result in step 11 and the focus detection areas obtained as the area search result in steps 12-13. Comparing the focus detection area 45*f* corresponding to the new tracking object region 47 obtained as the image tracking result with the focus detection areas 45*b*, 45*f* and 45*j* obtained as the area search result, as shown in FIG. 7, the focus detection area 45*f*, for example, is considered to be suitable as a position of the tracking object in any process and hence the area 45*f* is decided as an area where the focus adjustment is to be performed (i.e., a focus adjustment area). In step 15, the defocus amount detected in the focus detection area 45*f* is converted to a lens drive amount, and the photographic lens 15 is driven by the lens driving device 30 for the focus adjustment.

While the focus adjustment area is decided in step 14 based on the new tracking object region obtained as the image tracking result and the focus detection area found by the search made depending on the AF result, the processing in step 14 may be modified as follows. Whether the tracking target object is moving closer to or away from the camera in the direction of an optical axis of the camera is determined based on the difference between the defocus amount in the previous focus adjustment and the currently detected defocus amount in the focus detection area which has been found by the search. If it is determined that the tracking target object is moving closer to the camera, the template image is enlarged. To the contrary, if it is determined that the tracking target object is moving away from the camera, the template image is reduced. Such a modification can provide an appropriate template image more adapted for motions of the tracking target object.

During a period in which the shutter button is half-pressed, the processing of steps 10-15 is repeatedly executed. If the shutter button is fully pressed, the control flow proceeds to step 16 in which the above-described shooting process is executed.

Next, the automatic focusing (AF) operation and the image tracking operation according to the embodiment will be described with reference to FIGS. 11A and 11B. As described above, when the shutter button is half-pressed, the object tracking process, shown in FIGS. 8A and 8B, is started and the AF operation is first executed. In the AF operation, as shown in FIGS. 11A and 11B, charge accumulation in the ranging device 17 (i.e., AF accumulation) is performed and focus detecting computation (i.e., AF computation) is executed based on a focus detection signal obtained as the AF accumulation result. The focus adjustment of the photographic lens 15 (i.e., lens driving) is performed based on the AF computation result, i.e., the defocus amount, in the selected focus detection area. In an example shown in FIGS. 11A and 11B, the AF processing of steps 2-4 in FIG. 8A is repeated three times. If in-focus with the tracking target object is determined in step 5 in the third cycle of the AF processing, the image tracking operation is started. Incidentally, as shown in FIGS. 11A and 11B, when the threshold for making the in-focus determination in step 5 is larger than the threshold used in the AF function, an in-focus determination signal and a lens driving signal are both output.

In the image tracking operation, as shown in FIGS. 11A and 11B, a tracking initial image is first accumulated in the second image-sensing device 25 (i.e., image accumulation; step 7 of FIG. 8A). After obtaining the tracking initial image, the tracking initial process is executed (i.e., tracking initial process; step 8 of FIG. 8A). Then, a tracking next image is accumulated in the second image-sensing device 25 (i.e., image accumulation; step 10 of FIG. 8B). After obtaining the tracking next image, the tracking computation process is executed (i.e., tracking computation; step 11 of FIG. 8B).

After the image tracking operation described above, the AF operation is executed again with the image tracking result reflected thereon. More specifically, the defocus amount is detected for each of the focus detection areas, and the area having the defocus amount close to that used in the previous focus adjustment is searched for. The focus adjustment area is decided based on the area search result and the image tracking result. Then, the focus adjustment is performed based on the defocus amount of the decided focus adjustment area. Thereafter, during a period in which the shutter button is held half-pressed, the image tracking operation and the AF operation based on the image tracking result are executed repeatedly.

According to the embodiment, as described above, in the image tracking device having the image tracking function of comparing the object images, which are formed by the photographic lens 15 and are repeatedly captured by the second image-sensing device 25, with the template image and detecting the position of the tracking target in the screen of the photographic lens 15, and the autofocusing (AF) function of detecting the focus of the photographic lens 15 in the focus detection areas set within the screen and performing the focus adjustment of the photographic lens 15 based on the focus detection result, it is determined whether or not the focus detection result with the AF function is in focus, and the focus detection and the focus adjustment based on the AF function are performed in the focus detection area corresponding to the position of the tracking target in the screen. The image at the position of the tracking target in the object image, which is captured when the in-focus is determined, is obtained as the template image. Therefore, a sharp target image can be obtained as the reference image and tracking performance can be improved.

Also, according to the embodiment, since the template image is obtained from the image after the in-focus determination, the tracking process can be efficiently executed while making the image tracking operation synchronized with the autofocusing (AF) function.

While the above-described embodiment represents the example in which the charge accumulation in the ranging device 17 for the AF operation and the charge accumulation in the second image-sensing device 25 for the image tracking operation are successively executed in a synchronous relation as shown in FIGS. 11A and 11B, the charge accumulation in the ranging device 17 for the AF operation and the charge accumulation in the second image-sensing device 25 for the image tracking operation may be executed in an asynchronous relation.

FIGS. 12A, 12B, 12C and 12D are timing charts showing the autofocusing (AF) operation and the image tracking operation according to a modification of the embodiment when the charge accumulation in the ranging device 17 for the AF operation and the charge accumulation in the second image-sensing device 25 for the image tracking operation are executed in an asynchronous relation. Note that the following description is made primarily on different points while the description of similar points to those in the case of the synchronous operation, shown in FIGS. 11A and 11B, is omitted. In the case of executing the AF operation and the image tracking operation in an asynchronous relation, during a period in which a power source of the camera is turned on, the charge accumulation for each of the AF operation and the image tracking operation is always performed at a predetermined time interval even when the computation process based on the charge accumulation result is not executed.

Referring to FIGS. 12A to 12D, in an asynchronous operation (1), the tracking control section 36 executes the tracking initial process after the in-focus determination (after a lapse of time T1) by employing, as the tracking initial image, the tracking object image accumulated in the second image-sensing device 25. On the other hand, in an asynchronous operation (2), the tracking control section 36 executes the tracking initial process immediately after the in-focus determination by employing, as the tracking initial image, the tracking object image accumulated in the second image-sensing device 25 immediately before the in-focus determination (time T2 earlier). In the asynchronous operation (2), the time (T2) from the end of the charge accumulation immediately before the in-focus determination to arrival of a signal sent upon the in-focus determination in the asynchronous operation is shorter than the time from the in-focus determination to the start of the charge accumulation. Stated another way, in the examples shown in FIGS. 12A to 12D, an image obtained as a result of the charge accumulation completed earlier than the in-focus determination by the time T2 represents an image that is accumulated at the timing closer to the timing of the in-focus determination than an image obtained as a result of the charge accumulation started after the time T1 from the in-focus determination. Therefore, the image of the tracking object closer to the timing of in-focus with the tracking target can be obtained as the template image, and the tracking accuracy can be improved by using a sharp template image that is in focus with the tracking target. Thus, the tracking control section 36 sets T1 as a period from the time at which the signal is sent upon the in-focus determination to the time at which the image accumulation performed after the in-focus determination is started. Also, the tracking control section 36 sets T2 as a period from the time at which the signal is sent upon the in-focus determination to the time at which the image accumulation performed before the in-focus determination is ended. Additionally, the tracking control section 36 may decide the timing closer to the in-focus determination based on respective periods from the time at the middle of a period during which the AF accumulation is performed, to the start time, the end time and the middle time of the image accumulation.

According to the modification of the embodiment, as described above, since the template image is obtained from the object image captured at the timing closest to the timing of the in-focus determination, the tracking performance can be improved by using a sharper template image that is more in focus with the tracking target.

While a single-lens reflex digital still camera has been described in the foregoing embodiment, the present invention can be realized with any type of image-taking apparatus so long as it is able to capture images on the time serial basis. Thus, the present invention is also applicable to, other than the single-lens reflex digital still camera, a consumer digital camera, a video camera used as an image-taking apparatus that captures moving images, and so on.

While the foregoing embodiment has been described as obtaining the template image after confirming the in-focus state with respect to the tracking target object when the template image of the tracking target object is obtained after the start of the image tracking, the present invention can also be applied to the case where the tracking target object is changed from one to another during the image tracking operation for some reason. When the tracking target object is changed from one to another during the image tracking operation, a new template image is obtained after confirming the in-focus state of a new tracking target object.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and is desired to be secured by Letters Patent of the United States is:

1. An image apparatus comprising:
   a screen configured to display an image formed by an optical system and a plurality of detection position marks superimposed onto the image;
   a detecting unit configured to detect information regarding focus of the optical system at a detection position corresponding to at least one of the plurality of detection position marks;
   a determining unit connected to the detecting unit and configured to determine whether the information regarding the focus is within a predetermined range;
   an acquiring unit connected to the determining unit and configured to acquire reference image information of a tracking target at the detection position when the determining unit determines that the information regarding the focus is within the predetermined range after the detecting unit starts detecting the information regarding the focus, the acquiring unit being configured not to acquire the reference image information at the detection position when the determining unit determines that the information regarding the focus is not within the predetermined range after the detecting unit starts detecting the information regarding the focus; and
   a control unit connected to the acquiring unit and configured to evaluate subsequent image information using the reference image information to track the tracking target using the subsequent image information.

2. The image apparatus according to claim 1, wherein the acquiring unit is configured to acquire the reference image information from image information captured after the determining unit has determined that the information regarding the focus is within the predetermined range.

3. The image apparatus according to claim 1, wherein the acquiring unit is configured to acquire the reference image information from image information captured at timing closest to timing at which the determining unit has determined that the information regarding the focus is within the predetermined range.

4. The image apparatus according to claim 1, further comprising:
   an operating member configured to set the detection position arbitrarily.

5. The image apparatus according to claim 1, further comprising:
   a setting unit configured to set the detection position included in the first image information based on a detection result of the detecting unit.

6. The image apparatus according to claim 1,
   wherein the information regarding the focus comprises a defocus amount of the optical system, and
   wherein the determining unit is configured to determine that the information regarding the focus is within the predetermined range when the defocus amount is equal to or smaller than a preset threshold value.

7. The image apparatus according to claim 6, wherein the threshold value is set to a smaller value as the optical system has a longer focal length.

8. The image apparatus according to claim 6, wherein the threshold value is set to be a reduced value when an image capturing mode is set at a sports capturing mode.

9. The image apparatus according to claim 1, wherein the subsequent image information relates to a second area which is larger than a first area which relates to the reference image information.

10. The image apparatus according to claim 1, wherein the subsequent image information relates to an area including the at least one detection position.

11. The image apparatus according to claim 1, wherein the control unit is configured to evaluate the subsequent image information by detecting in the subsequent image information a region identical to or similar to the reference image information.

12. The image apparatus according to claim 1, wherein the reference image information includes image information of at least part of a main subject in the screen.

13. The image apparatus according to claim 1, wherein the screen is configured to display the plurality of detection position marks superimposed onto the image in both rows and columns.

14. An image-taking apparatus comprising:
an image apparatus comprising:
a screen configured to display an image formed by an optical system and a plurality of detection position marks superimposed onto the image;
a detecting unit configured to detect information regarding focus of the optical system at a detection position corresponding to at least one of the plurality of detection position marks;
a determining unit connected to the detecting unit and configured to determine whether the information regarding the focus is within a predetermined range;
an acquiring unit connected to the determining unit and configured to acquire reference image information of a tracking target at the detection position when the determining unit determines that the information regarding the focus is within the predetermined range after the detecting unit starts detecting the information regarding the focus, the acquiring unit being configured not to acquire the reference image information at the detection position when the determining unit determines that the information regarding the focus is not within the predetermined range after the detecting unit starts detecting the information regarding the focus; and
a control unit connected to the acquiring unit and configured to evaluate subsequent image information using the reference image information to track the tracking target using the subsequent image information.

15. The image-taking apparatus according to claim 14, wherein the screen is configured to display the plurality of detection position marks superimposed onto the image in both rows and columns.

16. An evaluation method comprising:
displaying in a screen an image formed by an optical system;
displaying a plurality of detection position marks superimposed onto the image;
detecting information regarding focus of the optical system at a detection position corresponding to at least one of the plurality of detection position marks;
acquiring reference image information of a tracking target at the detection position when the detected information is within a predetermined range after the detecting unit starts detecting the information regarding the focus;
repeating the detecting of the information regarding the focus until the determining unit determines that the information regarding the focus is within the predetermined range after the detecting unit starts detecting the information regarding the focus without the acquiring of the reference image information;
acquiring subsequent image information; and
evaluating the subsequent image information using the reference image information to track the tracking target using the subsequent image information.

17. The evaluation method according to claim 16, wherein the reference image information is acquired from image information captured after the detected information has been within the predetermined range.

18. The evaluation method according to claim 16, wherein the reference image information is acquired from image information captured at timing closest to timing at which the detected information has been within the predetermined range.

19. The evaluation method according to claim 16, further comprising:
setting the detection position arbitrarily.

20. The evaluation method according to claim 16, further comprising:
setting the detection position included in the reference image information based on the detected information.

21. The evaluation method according to claim 16,
wherein the information regarding the focus comprises a defocus amount of the optical system, and
wherein the detected information is within the predetermined range when the defocus amount is equal to or smaller than a preset threshold value.

22. The evaluation method according to claim 21, wherein the threshold value is set to a smaller value as the optical system has a longer focal length.

23. The evaluation method according to claim 21, wherein the threshold value is set to be a reduced value when an image capturing mode is set at a sports capturing mode.

24. The evaluation method according to claim 16, wherein the subsequent image information is acquired after acquiring the reference image information.

25. The evaluation method according to claim 16, wherein the subsequent image information relates to a second area which is larger than a first area which relates to the reference image information.

26. The evaluation method according to claim 16, wherein the subsequent image information relates to an area including the detection position.

27. The evaluation method according to claim 16, wherein the subsequent image information is evaluated by detecting in the subsequent image information a region identical to or similar to the reference image information.

28. The evaluation method according to claim 16, wherein the reference image information includes image information of at least part of a main subject in the screen.

29. The evaluation method according to claim 16, wherein the displaying of the plurality of detection position marks includes displaying the plurality of detection position marks superimposed onto the image in both rows and columns.

30. An image apparatus comprising:
screen means for displaying an image formed by an optical system and a plurality of detection position marks superimposed onto the image;
detecting means for detecting information regarding focus of the optical system at a detection position corresponding to at least one of the plurality of detection position marks;
determining means for determining whether the information regarding the focus is within a predetermined range;

acquiring means for acquiring reference image information of a tracking target at the detection position when the determining unit determines that the information regarding the focus is within the predetermined range after the detecting means starts detecting the information regarding the focus, the acquiring means being for not acquiring the reference image information at the detection position when the determining unit determines that the information regarding the focus is not within the predetermined range after the detecting unit starts detecting the information regarding the focus; and control means for evaluating subsequent image information using the reference image information to track the tracking target using the subsequent image information.

31. The image apparatus according to claim 30, wherein the screen means is for displaying the plurality of detection position marks superimposed onto the image in both rows and columns.

32. An image apparatus comprising:
a detecting unit which is capable of detecting information regarding focus at a plurality of regions and which is configured to detect information regarding focus at a detection region corresponding to at least one of the plurality of regions;
a determining unit connected to the detecting unit and configured to determine whether the information regarding the focus is within a predetermined range;
an acquiring unit connected to the determining unit and configured to acquire reference image information of a tracking target at the detection region when the determining unit determines that the information regarding the focus is within the predetermined range after the detecting unit starts detecting the information regarding the focus, the acquiring unit being configured not to acquire the reference image information at the detection region when the determining unit determines that the information regarding the focus is not within the predetermined range after the detecting unit starts detecting the information regarding the focus; and
a control unit connected to the acquiring unit and configured to evaluate subsequent image information using the reference image information to track the tracking target using the subsequent image information.

33. The image apparatus according to claim 32, wherein the detecting unit is configured to detect the information regarding the focus at the plurality of regions provided in both rows and columns.

34. The image apparatus according to claim 32, wherein the acquiring unit is configured not to acquire the reference image information of a tracking target at the detection region when the determining unit does not determine that the information regarding the focus is within the predetermined range.

35. An image apparatus comprising:
a detecting unit which is capable of detecting information regarding focus at a plurality of regions and which is configured to detect information regarding focus at a detection region corresponding to at least one of the plurality of regions;
a determining unit configured to determine whether the information regarding the focus is within a predetermined range;
a display unit configured to perform predetermined display when the determining unit determines that the information regarding the focus is within the predetermined range;
an acquiring unit configured to acquire reference image information of a tracking target when the determining unit determines that the information regarding the focus is within the predetermined range after the display unit performs the predetermined display, the acquiring unit being configured not to acquire the reference image information at the detection region when the determining unit determines that the information regarding the focus is not within the predetermined range after the detecting unit starts detecting the information regarding the focus; and
a control unit connected to the acquiring unit and configured to evaluate subsequent image information using the reference image information to track the tracking target using the subsequent image information.

36. The image apparatus according to claim 35, wherein the detecting unit is configured to detect the information regarding the focus at the plurality of regions provided in both rows and columns.

* * * * *